United States Patent
Ruh et al.

(10) Patent No.: US 10,145,712 B2
(45) Date of Patent: Dec. 4, 2018

(54) OPTICAL ENCODER INCLUDING DIFFUSER MEMBERS

(71) Applicant: Apple Inc., Cupertino, CA (US)

(72) Inventors: Richard Ruh, Cupertino, CA (US);
Prashanth S. Holenarsipur, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 520 days.

(21) Appl. No.: 14/841,801

(22) Filed: Sep. 1, 2015

(65) Prior Publication Data

US 2016/0069713 A1   Mar. 10, 2016

Related U.S. Application Data

(60) Provisional application No. 62/047,977, filed on Sep. 9, 2014, provisional application No. 62/130,038, filed on Mar. 9, 2015.

(51) Int. Cl.
*G01D 5/34* (2006.01)
*G01D 5/347* (2006.01)
*G01D 5/353* (2006.01)

(52) U.S. Cl.
CPC ........... *G01D 5/3473* (2013.01); *G01D 5/342* (2013.01); *G01D 5/34715* (2013.01); *G01D 5/34738* (2013.01); *G01D 5/35303* (2013.01)

(58) Field of Classification Search
CPC ............. G01D 5/34715; G01D 5/3473; G01D 5/34738; G01D 5/35303
USPC ............ 250/231.14, 231.15, 231.16, 231.17, 250/231.18
See application file for complete search history.

(56) References Cited

U.S. PATENT DOCUMENTS

| | | | |
|---|---|---|---|
| 4,199,741 A | | 4/1980 | Serrus Paulet |
| 4,275,674 A | * | 6/1981 | Carbonato ............. D05B 19/10 |
| | | | 112/445 |
| 4,336,446 A | | 6/1982 | Hafner |

(Continued)

FOREIGN PATENT DOCUMENTS

| WO | WO 09/023395 | 2/2009 |
|---|---|---|
| WO | WO 15/034960 | 3/2015 |

(Continued)

OTHER PUBLICATIONS

U.S. Appl. No. 15/103,091, filed Jun. 9, 2016, Moussette et al.
U.S. Appl. No. 15/714,691, filed Sep. 25, 2017, Lin et al.

*Primary Examiner* — Georgia Y Epps
*Assistant Examiner* — Kevin Wyatt
(74) *Attorney, Agent, or Firm* — Brownstein Hyatt Farber Schreck, LLP

(57) ABSTRACT

An optical encoder having diffuser members, and methods for detecting the rotational movement of the cylinder of the optical encoder are disclosed. The optical encoder may include a rotatable cylinder configured to reflect light. The rotatable cylinder may include an encoding pattern of alternating reflective stripes having distinct light-reflective properties. The optical encoder may also include a light source positioned adjacent the rotatable cylinder, and an array of optical sensors positioned adjacent the rotatable cylinder. The array of optical sensors may receive the reflected light from the rotatable cylinder. The optical encoder may include a diffuser member positioned on the rotatable cylinder, the light source, and the array of optical sensors.

22 Claims, 13 Drawing Sheets

(56) References Cited

U.S. PATENT DOCUMENTS

| | | | |
|---|---|---|---|
| 4,618,995 A * | 10/1986 | Kemp | H04H 60/44 |
| | | | 455/2.01 |
| 4,641,182 A * | 2/1987 | Gur | H04N 3/02 |
| | | | 348/164 |
| 4,668,911 A | 5/1987 | Mueller | |
| 5,047,629 A | 9/1991 | Geist | |
| 5,382,792 A | 1/1995 | Hurst et al. | |
| 5,748,111 A | 5/1998 | Bates | |
| 5,867,082 A | 2/1999 | Van Zeeland | |
| 6,128,006 A | 10/2000 | Rosenberg et al. | |
| 6,639,206 B1 * | 10/2003 | Rothamel | G01D 5/347 |
| | | | 250/231.13 |
| 6,707,443 B2 | 3/2004 | Bruneau et al. | |
| 7,190,638 B2 | 3/2007 | Oguchi | |
| 7,230,959 B2 | 6/2007 | Johnson | |
| 7,265,336 B2 | 9/2007 | Hataguchi | |
| 7,385,874 B2 | 6/2008 | Vuilleumier | |
| 7,404,667 B2 | 7/2008 | Born et al. | |
| 7,520,664 B2 | 4/2009 | Wai | |
| 7,969,337 B2 | 6/2011 | Ratnakar et al. | |
| 8,002,089 B2 | 8/2011 | Jasso et al. | |
| 8,220,987 B2 | 7/2012 | Kimura et al. | |
| 8,305,171 B2 | 11/2012 | Kimura et al. | |
| 8,350,562 B2 | 1/2013 | Gailledrat | |
| 8,395,111 B2 | 3/2013 | Le | |
| 8,577,289 B2 | 11/2013 | Schlub et al. | |
| 8,743,083 B2 | 6/2014 | Zanone et al. | |
| 8,783,944 B2 | 7/2014 | Doi | |
| 8,824,245 B2 | 9/2014 | Lau et al. | |
| 8,847,145 B2 | 9/2014 | Masa | |
| 9,088,282 B2 | 7/2015 | Holenarsipur et al. | |
| 9,091,715 B2 | 7/2015 | Alameh et al. | |
| 9,188,462 B2 | 11/2015 | Omoto et al. | |
| 9,223,296 B2 | 12/2015 | Yang | |
| 9,483,031 B2 | 11/2016 | Yanagisawa | |
| 9,490,804 B2 | 11/2016 | Hanumanthaiah et al. | |
| 9,651,405 B1 | 5/2017 | Gowreesunker et al. | |
| 2003/0201979 A1 | 10/2003 | Sandage et al. | |
| 2004/0088898 A1 * | 5/2004 | Barrett | F41G 1/38 |
| | | | 42/119 |
| 2005/0116153 A1 * | 6/2005 | Hataguchi | G01D 5/34707 |
| | | | 250/231.13 |
| 2006/0091304 A1 * | 5/2006 | Saint Clair | G01D 5/34738 |
| | | | 250/231.13 |
| 2007/0053672 A1 * | 3/2007 | Westerweck | G01D 5/3473 |
| | | | 396/79 |
| 2007/0242569 A1 | 10/2007 | Inoue et al. | |
| 2008/0290261 A1 * | 11/2008 | Doe | G01D 5/3473 |
| | | | 250/221 |
| 2010/0282955 A1 | 11/2010 | Poon | |
| 2011/0109232 A1 * | 5/2011 | Schulz | G01J 1/02 |
| | | | 315/151 |
| 2012/0242626 A1 | 9/2012 | Hu | |
| 2013/0076375 A1 | 3/2013 | Hanumanthaiah et al. | |
| 2015/0048242 A1 | 2/2015 | Remillard et al. | |
| 2016/0058375 A1 | 3/2016 | Rothkopf | |
| 2016/0061636 A1 | 3/2016 | Gowreesunker et al. | |
| 2016/0069712 A1 | 3/2016 | Holenarsipur et al. | |
| 2016/0258784 A1 | 9/2016 | Boonsom et al. | |
| 2016/0313794 A1 | 10/2016 | Moussette et al. | |
| 2016/0313808 A1 | 10/2016 | Wu et al. | |
| 2017/0090592 A1 | 3/2017 | Ely et al. | |
| 2017/0248446 A1 | 8/2017 | Gowreesunker et al. | |

FOREIGN PATENT DOCUMENTS

| | | | |
|---|---|---|---|
| WO | WO 15/122885 | 8/2015 | |
| WO | WO 2015147756 A1 * | 10/2015 | G01D 5/342 |

\* cited by examiner

OPTICAL ENCODER INCLUDING DIFFUSER MEMBERS

CROSS-REFERENCE TO RELATED APPLICATIONS

This application is a nonprovisional patent application of and claims the benefit to U.S. Provisional Patent Application No. 62/047,977, filed Sep. 9, 2014, and titled "Optical Encoder including Diffuser Members," and U.S. Provisional Patent Application No. 62/130,038, filed Mar. 9, 2015, and titled "Optical Encoder including Diffuser Members," the disclosures of which are hereby incorporated herein by reference in their entirety.

FIELD

The disclosure relates generally to electronic devices, and more particularly to optical encoders having diffuser members, and methods for detecting the rotational movement of an input device using the optical encoders having diffuser members.

BACKGROUND

Many devices, including mechanical, electronic, and computerized devices, may utilize various types of sensors for obtaining user input or receiving motion input from other aspects of the device. Traditionally, a rotary sensor may be used to measure rotary motion of a device or component. However, many traditional rotary sensors are not well adapted for use in a small or compact space that may be required for an electronic device having a small form factor. It is with respect to these and other general considerations that embodiments have been made.

SUMMARY

An electronic device is disclosed. The electronic device comprises a housing, a crown coupled to the housing and configured to receive rotational input, and an optical encoder positioned within the housing. The optical encoder comprises a rotatable cylinder in communication with the crown, and an encoding pattern formed on an outer surface of the rotatable cylinder. The encoding pattern comprises a group of light-reflective markings and a group of non-reflective markings interspersed with the group of light-reflective markings. The optical encoder also comprises a light source positioned adjacent the rotatable cylinder. The light source provides a light beam to the rotatable cylinder to be reflected. Additionally, the optical encoder comprises an array of optical sensors positioned adjacent the rotatable cylinder. The array of optical sensors is configured to receive a reflected light beam from the rotatable cylinder. The light beam provided by the light source is axially diffused prior to being received by the array of optical sensors. In particular, the light beam may be spread or widened in at least an axial direction along a length of the rotatable cylinder.

Additionally, an optical encoder for an electronic device is disclosed. The optical encoder comprises a rotatable cylinder configured to reflect light. The rotatable cylinder comprises an encoding pattern of alternating reflective stripes having distinct light-reflective properties. The optical encoder also comprises a light source positioned adjacent the rotatable cylinder and an array of optical sensors positioned adjacent the rotatable cylinder. The array of optical sensors receives the reflected light from the rotatable cylinder. Additionally, the optical encoder comprises a diffuser member positioned on the rotatable cylinder, the light source, and the array of optical sensors.

A method of detecting rotational movement of a rotatable cylinder of an optical encoder is disclosed. The method comprises emitting a light beam, via a light source, toward the rotatable cylinder, reflecting the emitted light beam at the rotatable cylinder, and receiving the reflected light beam at an array of optical sensors. The method also comprises axially diffusing at least one of the emitted light beams, or the reflected light beam using a diffuser member prior to receiving the reflected light beam. Additionally, the method comprises estimating an amount of rotation of the rotatable cylinder based on the received reflected light beam at the array of optical sensors.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic devices, and more particularly, to optical encoders having diffuser members and methods for detecting the rotational movement of an input device using the optical encoders having diffuser members.

In a particular embodiment, the use of diffuser members within the optical encoder may aid in the detection of the reflected light by the optical sensors, even when a rotatable cylinder reflecting the light is misaligned. Further, embodiments discussed herein may provide more precision in detecting rotation and/or position of an encoded cylinder or other encoded structure. By utilizing diffuser members, the light provided to, and reflected from, the misaligned rotatable cylinder may be diffused and/or spread out prior to reaching or contacting the optical sensors to ensure the optical sensors detect some of the reflected light. The diffuser members may include a diffuser covering the light source, a diffuser disposed over the optical sensors and/or a plurality of diffusers disposed around the rotatable cylinder.

The diffusion process may expand, spread-out, or otherwise widen a beam of light into a widened beam and/or may form an axially-widened beam from the single beam of light. The light diffusion process may be referred to herein axially diffusing a beam of light, which may include spreading, widening or otherwise diffusing the light along at least an axial direction along the length of the encoded cylinder. Additionally, the diffuser members may be configured to focus and/or group a majority of the diffused beams into a centralized cluster of light beams. By focusing and/or grouping the majority of the diffused beams to a centralized cluster of light beams, the optical encoder including the diffuser members may reduce over exposure of the optical sensor, which may result in insufficient or inaccurate detection.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
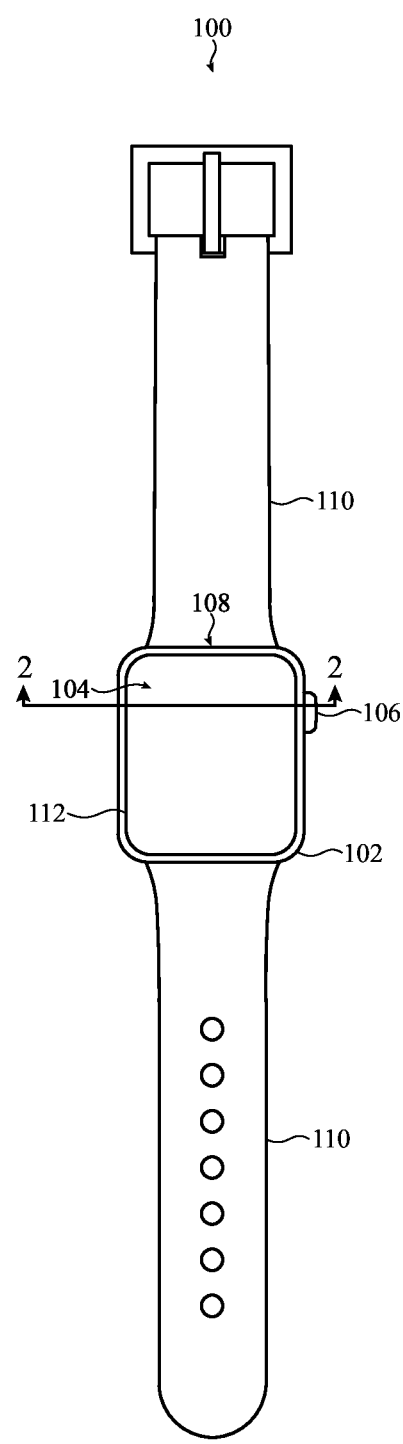
FIG. 1 depicts an illustrative top view of a wearable electronic device.

FIG. 1 shows an illustrative top view of a portable or wearable electronic device 100 (hereafter, "electronic device"), according to embodiments. Electronic device 100, as shown in FIG. 1, may be configured as a wearable device such as a smart watch. However, it is understood that electronic device 100 can be configured as a smart phone, a laptop or desktop computer, a tablet computing device, a gaming device, a display, a digital music player, a wearable computing device or display, a health monitoring device, and so on.

Electronic device 100 may include a housing 102 at least partially surrounding a display 104 and one or more buttons or input devices. As shown in FIG. 1, and discussed herein, the input device may be a crown 106 for electronic device 100. Crown 106 may be configured as a multi-input device, such as a rotary sensor configured to receive multiple forms of input. Specifically, crown 106 of electronic device 100 may be configured to receive and/or provide input to electronic device 100 based on rotational input to crown 106 and/or force or displacement input applied to crown 106. As a result, crown 106 may be used to select, adjust or change various images that are output on the display 104. For example, if the display 104 of the electronic device 100 is displaying a time-keeping application, the crown 106 may be rotated in either direction to change or adjust the position of the hands or the digits that are displayed for the time keeping application. In other embodiments, the crown 106 may be rotated to move a cursor or other type of selection mechanism from a first displayed location to a second displayed location in order to select an icon or move the selection mechanism between various icons that are output on the display 104.

As discussed herein, crown 106 may include and/or be coupled to an optical encoder (see, FIG. 2) positioned within housing 102 for detecting various forms of input to electronic device 100, including rotational input provided to crown 106. Additionally, and as discussed herein in detail, the optical encoder coupled to and/or included with crown 106 may include a diffuser member to aid in the detection of the rotational input provided to crown 106. The inclusion of a diffuser member within the optical encoder may provide more precision in detecting rotation and/or position of encoded structures of the optical encoder, even when portions of the optical encoder become misaligned. This is achieved by diffusing and/or spreading out light emitted and/or detected by the optical encoder to ensure the optical encoder detects a sufficient amount of reflected light to determine the rotation and/or position of crown 106 during operation of the optical encoder.

The housing 102 may form an outer surface, partial outer surface, and/or protective case for the internal components of electronic device 100, and may at least partially surround the display 104. Housing 102 may be formed from a plurality of distinct materials including, but not limited to, metal, glass or plastic. As shown in FIG. 1, housing 102 may also have recesses 108 formed on opposite ends to connect a wearable band 110 to electronic device 100. Wearable band 110 may be used to secure electronic device 100 to a user, or any other object capable of receiving electronic device 100.

Display 104 is positioned at least partially within an opening formed in housing 102. Display 104 may be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. A cover 112 may be positioned above the touchscreen of display 104. That is, cover 112 may be positioned above the touchscreen of display 104 and may be at least partially positioned within an opening of housing 102 and coupled to housing 102. Cover 112 may protect display 104 from contaminants, without obstructing a user's view and/or ability to interact with display 104 and/or electronic device 100. As such, cover 112 may be transparent or translucent, fully or partially, in certain embodiments.

Figure 2:
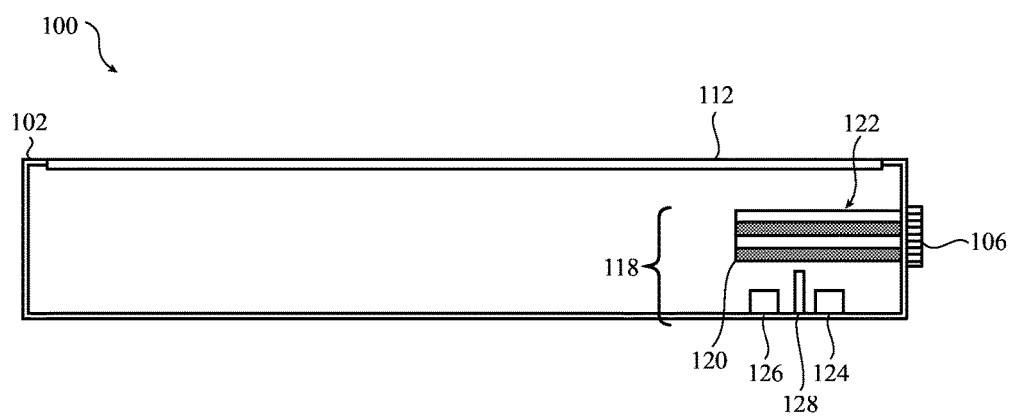
FIG. 2 depicts an enlarged cross-section view of a portion of the electronic device of FIG. 1, taken along line 2-2.

FIG. 2 illustrates a cross-section view of electronic device 100 of FIG. 1 according to one or more embodiments. As shown in FIG. 2, the electronic device 100 includes an optical encoder 118 that includes of a rotatable cylinder 120 having an encoding pattern 122, a light source 124, and optical sensors 126. Although optical sensors 126 are specifically mentioned, embodiments disclosed herein may use various types of sensors that are arranged in various configurations for detecting the movement described herein. For example, the movement of the cylinder 120 may be detected by an image sensor, a photodiode array, a photovoltaic cell or system, photo resistive component, a laser scanner and the like.

In embodiments, and as will be discussed below, the optical encoder 118 is used to determine positional data of the cylinder 120, which may be manipulated by the crown 106. More specifically, the optical encoder 118 may be used to detect movement of the cylinder 120 (and indirectly the crown 106) including the direction of the movement, speed of the movement and so on. The movement may be rotational movement, translational movement, angular movement and, so on. The optical encoder 118 may also be used to detect the rotation of the cylinder 120, and the speed and the direction of rotation of the cylinder 120.

Once the movement data of the cylinder 120 is determined, one or more graphics, images or icons on the display 104 of the electronic device 100 may be updated or altered accordingly, and/or the movement data may be used to interpret a user input. For example, and as discussed herein, crown 106 may be rotated in a clockwise manner in order to change the displayed time. In another non-limiting example where electronic device 100 includes a scrollable menu or options, crown 106 may be rotated by the user to scroll or move through the scrollable menu or options. The optical encoder 118 may detect the original starting position of the crown 106 and cylinder 120, the rotational movement of the cylinder 120 (and thus crown 106) in the clockwise direction, and may also detect the speed at which the cylinder 120 (and thus crown 106) is being rotated.

As shown FIG. 2, the optical encoder 118 may include a rotatable cylinder 120. The cylinder 120 may be coupled to the crown 106. In another embodiment the cylinder 120 may be an extension of the crown 106. That is, the crown 106 and the cylinder 120 may be manufactured as a single piece. As the cylinder 120 is coupled to, or is otherwise a part of the crown 106, as the crown 106 rotates or moves in a particular direction and at a particular speed, the cylinder 120 also rotates or moves in the same direction and with the same speed. In a non-limiting example shown in FIG. 2, cylinder 120 is an elongated shaft configured to rotate and/or be rotated as crown 106 rotates. In another non-limiting example, cylinder 120 is a drum coupled to a rotatable shaft (not shown) positioned through the drum. In the non-limiting example, the shaft coupled to the drum is configured to rotate the drum.

The cylinder 120 of the optical encoder may include an encoding pattern 122. As discussed, the encoding pattern 122 is used to determine positional information about the cylinder 120 including rotational movement, angular displacement and movement speed, which may be correlated to motion of the crown 106 and may be used as input to the electronic device. The encoding pattern 122 may include a plurality of light and dark stripes such as shown in FIG. 2.

Although light stripes and dark stripes are specifically mentioned and shown, the encoding pattern may consist of various types of stripes having various shades or colors that provide surface contrasts. For example, the encoding pattern may include a stripe or marking that has a high reflective surface and another stripe that has a low reflective surface regardless of the color or shading of the stripes or markings. In another embodiment, a first stripe of the encoding pattern may cause specular reflection while a second stripe of the encoding pattern may cause beam-dispersive reflection. When the reflected light is received by the photodiode array, a determination may be made as to the position and movement of the cylinder such as described below. In embodiments where a holographic or diffractive pattern is used, the light from the light source will diffract from the cylinder. Based on the diffracted light, the photodiode array may determine the position, movement and direction of movement of the cylinder.

In embodiments, the stripes of the encoding pattern 122 extend axially along the cylinder 120. The stripes may extend along the entire length of the cylinder 120 or partially along a length of cylinder 120. In addition, the encoding pattern 122 may also be disposed around the entire outer surface of the cylinder 120.

The light and dark stripes of the encoding pattern 122 may alternate between a light stripe and a dark stripe. In another embodiment, the light stripes and the dark stripes of the encoding pattern 122 may be arranged in a particular pattern or order. In such embodiments, each section of the pattern may be used to indicate a position of the cylinder 120.

Depending on the use of the cylinder 120, the length of the cylinder 120 may vary between embodiments. For example, in some embodiments, the length of the cylinder 120 may extend along a length and/or width of the housing 102. In another embodiment, the cylinder 120 may have a length that is substantially less than a length and/or width of the housing 102.

The optical encoder 118 may also include a light source 124 positioned adjacent rotatable cylinder 120. The light source 124, as shown in FIG. 2, may provide light to cylinder 120 to detect the movement and/or rotation of cylinder 120. Specifically, light source 124 may provide a continuous beam of light angularly toward cylinder 120 to be subsequently reflected toward optical sensors 126, as discussed herein. The light source 124 may include an suitable light-emitting device. In a non-limiting examples, light source 124 may include a light emitting diode (LED) or an infrared (IR) light source (e.g., IR LED).

Optical encoder 118 may include optical sensors 126 (one of which is shown) positioned adjacent rotatable cylinder 120 and light source 124. The optical sensors 126 are configured to receive light that is reflected off of the cylinder 120. Specifically, the optical sensors 126 are configured to receive light of different intensity values based on whether the light has been reflected off of the encoding pattern 122 and in a direction toward optical sensors 126 in a diffusive manner, a dispersive manner, a specular manner or a combination thereof. As discussed herein, optical sensors 126 may be radially aligned and offset from cylinder 120 of optical encoder 118.

In a non-limiting example, the optical sensors 126 may receive light that is reflected off of the encoding pattern 122. That is, as light from the light source 124 hits the various stripes of the encoding pattern 122, the light is reflected off of the light stripes in a specular manner and is reflected off of the dark stripes in a dispersive manner. The various intensities of the reflected light are then received by the optical sensors 126 which then convert the reflected light into an output current.

Optical encoder 118 may also include a wall member 128 positioned between light source 124 and optical sensors 126. As shown in FIG. 2, wall member 128 may form a barrier between light source 124 and optical sensors 126, and may be positioned proximate to and/or below cylinder 120. As discussed herein, the light emitted by light source 124 may pass over and/or above wall member 128 to contact and reflect from cylinder 120 toward optical sensors 126. Additionally as discussed herein, wall member 128 may prevent the light from light source 124 from being directly exposed to optical sensors 126, and/or may prevent light from being reflected back toward light source 124 during operation of optical encoder 118.

Although not shown in FIG. 2, optical encoder 118 may also include diffuser members (see, FIGS. 3A-8B). As discussed herein in detail, diffuser members may be positioned on cylinder 120, light source 124 and/or optical sensors 126 to aid in the axial diffusion of the light within optical encoder 118 when cylinder 120 may be misaligned or displaced within housing 102 of electronic device 100.

Figure 3A:
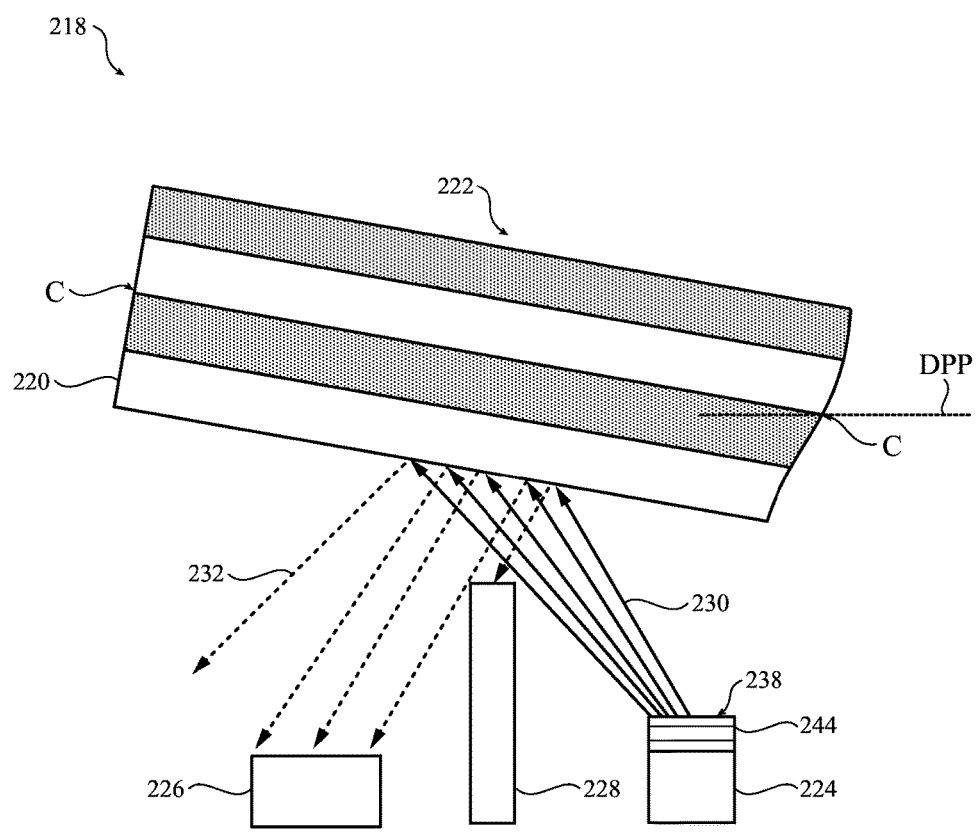
FIGS. 3A-3C depict side views of an optical encoder.
Figure 3B:
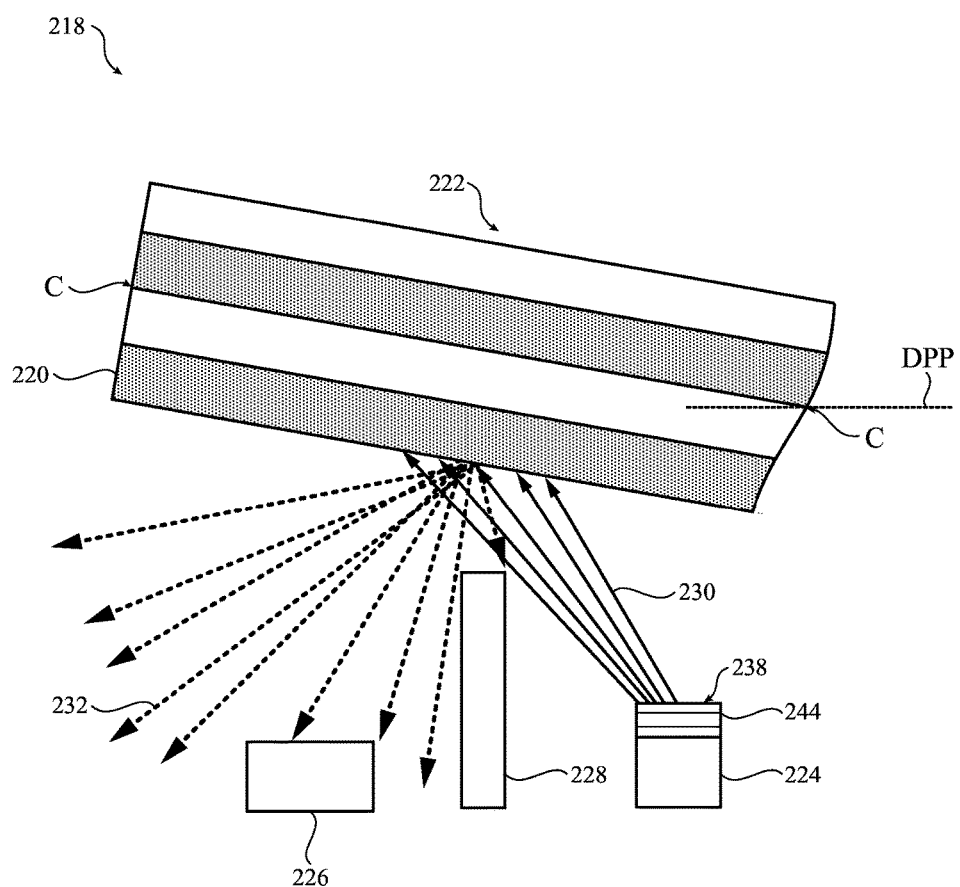
Figure 3C:
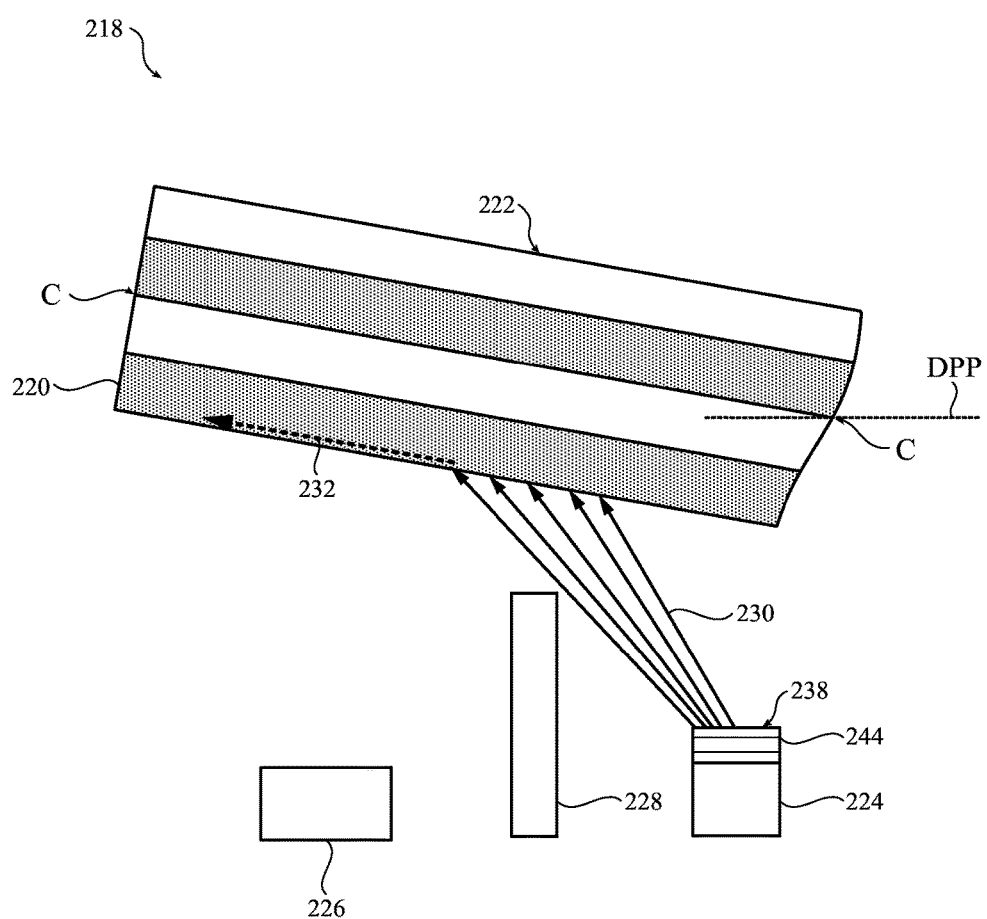

FIGS. 3A-3C illustrate side views of optical encoder 218 having optical sensor 226 radially aligned with respect to the cylinder 220 of the optical encoder 218. In embodiments, the optical encoder 218 may be similar to the optical encoder shown and described with respect to FIG. 2. It is understood that similarly numbered and/or named components may function in a substantially similar fashion. Redundant explanation of these components has been omitted for clarity.

During operation or with time, or due to impact events, cylinder 220 of optical encoder 218 may become misaligned or angled from its standard operating position. In the non-limiting example shown in FIGS. 3A-3C, cylinder 220 may be angled such that the center (C) of cylinder 220 may be misaligned from a desired, planar position (DPP) for cylinder 220 (e.g., aligned position). As shown in FIGS. 3A-3C, cylinder 220 may be substantially angled away from light source 224. Cylinder 220 may be misaligned for a number of reasons. In non-limiting examples, cylinder 220 may be misaligned due to nominal movement within the device, or more drastically, electronic device 100 may undergo a shock event (e.g., drop, high-impact contact), that may shift and/or misalign cylinder 220 and/or crown 106 within housing 102 of electronic device 100 (see, FIGS. 1 and 2).

In embodiments, the light source 224 and the optical sensors 226 are axially aligned with respect to the cylinder 220. As a result, and as discussed in detail herein, light beam emitted from light source 224 may be axially diffused, diffused along an axis of cylinder 220 when emitted toward cylinder 220, and ultimately optical sensors 226 and/or the light beam may be axially widened. For example, the light beam may be widened in at least an axial direction along a length of the cylinder 220. FIGS. 3A-3C only depict a single optical sensor 226 representing the array or plurality of optical sensors 226 of optical encoder 218. Although only one sensor is shown and described, any number of sensors may be used for the array or plurality of optical sensors 226. For example, the number of sensors may increase or decrease depending on the size of the collection area of each of the photodiodes forming optical sensors 226, as described above.

As discussed herein, the encoding pattern 222 of cylinder 220 may include a plurality of different colored stripes or shaded stripes. In the non-limiting example shown in and discussed with respect to FIGS. 3A-3C, a first stripe of the encoding pattern may be in a first color and/or have a first reflective quality, and a second stripe of the encoding pattern 222 may be in a second color and/or have a second reflective quality (for example, one stripe may reflect light in a specular fashion and one may reflect light in a dispersive fashion). As different colors or reflective qualities may be used, the optical sensors 126 may be color-sensitive. Accordingly, the change in color or reflective quality in the encoding pattern 222 as the cylinder rotates about its axis may be used to determine rotational movement and speed of the cylinder 220.

In certain embodiments, and as shown in FIGS. 3A-3C, the stripes of the encoding pattern 222 are axially aligned with respect to the cylinder 220 and/or aligned along a longitudinal axis of cylinder 220. In addition, the markings of the encoding pattern 222 are arranged around an outer surface of the cylinder 220. As discussed in detail herein, FIG. 3A shows diffused emitted light 230 reflecting from a first marking of the encoding pattern 222 that reflects the light in a specular manner, and FIG. 3B shows diffused emitted light 230 reflecting from a second marking of the encoding pattern 222 that disperses the beam of reflected light 232. Additionally, and as discussed herein in detail, FIG. 3C shows diffused emitted light 230 reflecting from a second marking of the encoding pattern 222 that substantially absorbs diffused, emitted light 230, such that reflected light 232 is not formed and/or achieved within optical encoder 218.

As discussed above, the markings of the encoding pattern 222 may be configured to cause specular reflection and/or dispersive reflection. For example, as shown in FIG. 3A and discussed in detail below, encoding pattern 222 of cylinder 220 may include a light stripe or color (or stripe having a first reflective quality), which may reflect emitted light 230 provided by light source 224 in a specular manner from the cylinder 220 to the optical sensors 226. The emitted light 230 may be reflected in a specular manner toward optical sensors 226 as a result of the light stripe of encoding pattern 222 having specular reflective properties, as discussed herein.

In another example shown in FIG. 3B and discussed in detail below, encoding pattern 222 of cylinder 220 may include a dark stripe or color (or stripe having a second reflective quality), which may reflect emitted light 230 provided by light source 224 in a dispersive manner from cylinder 220 to form reflected light 232. Reflected light 232 may be reflected from cylinder 220 to the optical sensors 226 in a dispersive manner. The reflected light 232 may be dispersed in various directions toward optical sensors 226. The reflected light 232 may be reflected in a dispersive manner toward optical sensors 226 as a result of the stripe of encoding pattern 122 having dispersive-reflection properties, as discussed herein.

As shown in FIGS. 3A-3C, emitted light 230 provided by light source 224 may be provided to cylinder 220 over, or without obstruction by wall member 228. Additionally, as shown in FIGS. 3A-3C, reflected light 232 may be reflected toward optical sensors 226 without obstruction from wall member 228. As discussed herein, wall member 228 may prevent dispersive reflected light 232 from being reflected back toward light source 224 and/or from crossing or interfering with emitted light 230. The path in which light travels from light source 224 to optical sensors 226 indicates the light path for optical encoder 218. That is, the combination of emitted light 230 and reflected light 232, and the direction and/or space in which it travels in, may be considered the light path for optical encoder 218, which may determine the amount and/or speed of rotation for cylinder 220 of optical encoder 218, as discussed herein.

As shown in FIGS. 3A-3C, optical encoder 218 may include a diffuser member 238 positioned on light source 224 and/or on a housing enclosing light source 224. Diffuser member 238 positioned on light source 224 may include a diffuser window 244 covering at least a portion of light source 224. Diffuser window 244 may cover a top surface of light source 224 (or its housing), and may be positioned between light source 224 and cylinder 220. As shown in FIGS. 3A-3C, by positioning diffuser window 244 over a top surface of light source 224, emitted light 230 provided by light source 224 may pass through diffuser window 244 before contacting cylinder 220. In a non-limiting example, emitted light 230 may pass through diffuser window 244, and may undergo a diffusing process, prior to being provided to cylinder 220. In the non-limiting example shown in FIGS. 3A-3C, diffuser window 244 may diffuse axially and/or widen the light-emission area of emitted light 230 in an axial direction with respect to cylinder 220. As such, diffused, emitted light 230 may contact cylinder 220 in a wider area for reflection toward optical sensor 226.

As used herein, the terms "diffuse" or "diffusing" refer to spreading-out, expanding, directing and/or scattering light beams that are emitted from light source 224 and/or reflected from cylinder 220. Specifically, diffusing light as discussed herein may equate to directing and/or dispersing light such that when a single beam of light that is either emitted or reflected is diffused the area of emission for the light beam is widened to cover and/or contact a larger area of optical sensors 226, for example. In addition to directing the light, diffusing light, as discussed herein, may also include varying and/or altering the light intensity of each diffused light beam.

Diffuser member 238, as shown in FIG. 3A-3C may be configured as any suitable component that is configured to axially diffuse light emitted by light source 224 of optical encoder 218. In a non-limiting example, diffuser member 238 may be formed as a lens having a convex or a concave shape in at least a portion of the lens for axially diffusing light. The lens may be positioned completely over light source 224, such that any light emitted by light source 224 must pass through diffuser member 238 and subsequently the light beam may be axially diffused and/or widened in an axial direction, prior to contacting cylinder 220 of optical encoder 218. For example, the diffuser member 238 may be configured to widen the light bean in an axial direction that is along a length of the cylinder 220.

Each of the non-limiting examples shown in FIGS. 3A-3C are now discussed in additional detail. As shown in FIG. 3A, emitted light 230 may be diffused by diffuser window 244. In a non-limiting example, diffuser window 244 may be configured to diffuse emitted light 230 in an axial direction that may be parallel to a strip of encoding pattern 222 formed on cylinder 220. Subsequent to the diffusing of emitted light 230 by diffuser window 244, axially diffused emitted light 230 may contact and reflect from a portion of cylinder 220 including a light stripe or color. As discussed herein, light stripe or color may reflect the axially diffused emitted light 230 in a specular manner. However, as shown in FIG. 3A, as a result of emitted light 230 being axially diffused by diffuser window 244 before contacting cylinder 220, light stripe or color of cylinder 220 may reflect beams of light of reflected lights 232 that may be directed toward optical sensor 226 and may cover a larger region than would be the case if the diffuser window 244 were absent. As such, a portion of the reflected beam of light 232 may contact optical sensor 226 even if the cylinder is misaligned, as shown. Thus, the diffuser may increase a range of angles of the cylinder at which the optical sensor 226 may receive reflected light, and thus increase a range of angles at which the optical encoder works to determine a movement or rotation of cylinder 220, as discussed herein.

As shown in FIG. 3B, cylinder 220 of optical encoder 218 may be substantially rotated, such that a dark stripe or color of cylinder 220 may be contacted by axially diffused emitted light 230. As discussed herein, dark stripe or color of cylinder 220 may reflect light in a dispersive manner. As such, diffused emitted light 230 may undergo a dispersive process when reflected from the dark stripe or color of cylinder 220. In some embodiments, the dark stripe or color of cylinder 220 may disperse emitted light 230, such that reflected light 232 is dispersed toward optical sensors 226 in a variety of different directions. As shown in FIG. 3B, the dispersive process performed in optical encoder 218 may result in reflected light 232 being dispersed throughout the housing of the electronic device (see, FIG. 2). This may ultimately result in only a minimal portion of the dispersed reflected light 232 contacting optical sensor 226 of optical encoder 218. The variance in the amount of light received by any one of the optical sensors 226, and the pattern in which the light varies between or among optical sensors 226 (or with respect to a single sensor), may provide data regarding the rotation of the cylinder. Such data may include, but is not limited to, speed of rotation, direction of rotation, rotational position, and/or angular offset of the cylinder. Some or all of these may be used as input to the associated electronic device.

In another non-limiting example, a dark stripe or color of encoding pattern 222 formed on cylinder 220 may absorb emitted light 230 provided by light source 224. In a non-limiting example shown in FIG. 3C, emitted light 230 may be provided to cylinder 220, and may contact dark stripe or color of encoding pattern 222, where the dark stripe or color has light absorbent properties. As a result, when emitted light 230 contacts the dark stripe or color of encoding pattern 222, no (or very little) reflective light may be provided to optical sensors 226. As such, when no reflective light is provided to optical sensors 226, optical sensors 226 may detect a drop in current or exposure, and may determine that light source 224 is providing emitted light to the dark stripe or color of encoding pattern 222 formed on cylinder 220 having light absorbent properties. This, again, may be used to determine various data regarding rotation of the cylinder and, in turn, input to the electronic device.

Figure 4A:
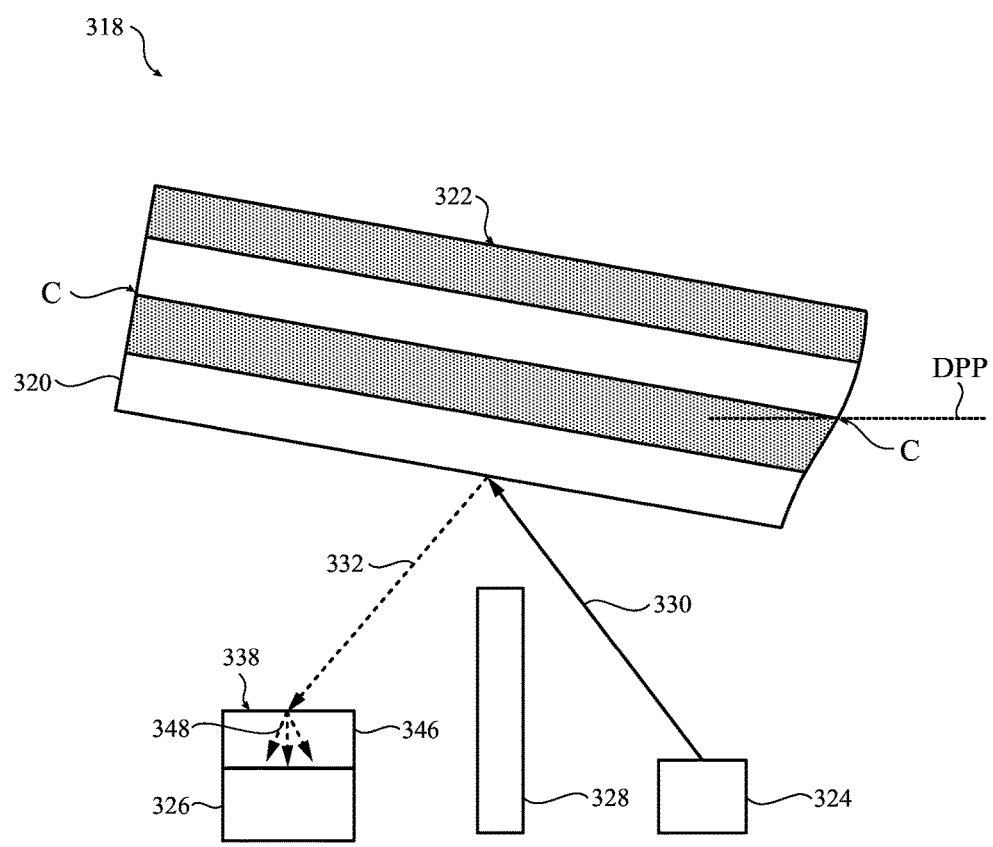
FIGS. 4A and 4B depict side views of an optical encoder.
Figure 4B:
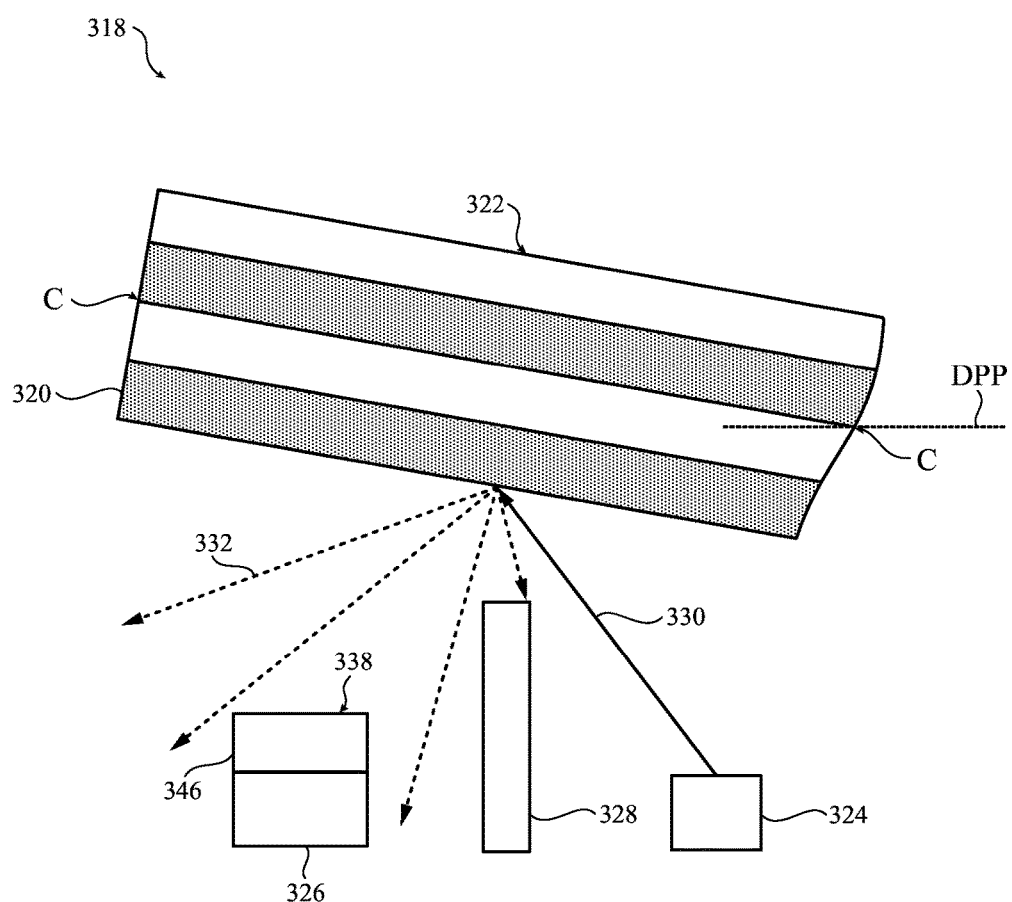

FIGS. 4A and 4B depict side views of another non-limiting example of an optical encoder 318. Optical encoder 318 may include cylinder 320 misaligned or angled similar to cylinder 220 in FIGS. 3A-3C. Additionally, cylinder 320 may include encoding pattern 322 substantially similar to that of the encoding pattern 222 of cylinder 220 discussed herein with respect to FIGS. 3A-3C. Redundant explanation of these components has been omitted for clarity.

As shown in FIGS. 4A and 4B, optical encoder 318 may include a diffuser member 338 positioned on the optical sensors 326 (or in a housing of the optical sensors). As shown in FIGS. 4A and 4B, diffuser member 338 may be formed from a diffuser sheet 346 disposed over at least a portion of the array or plurality of optical sensors 326 (or their housing(s)). Diffuser sheet 346 may cover at least a portion of the exposed surface of the plurality of optical sensors 326 that may receive the reflected light 332 from cylinder 320. Additionally, diffuser sheet 346 may be positioned between cylinder 320 and optical sensors 326, such that reflected light 332 may pass through diffuser sheet 346 prior to contacting optical sensors 326. By passing through diffuser sheet 346, reflected light 332 may undergo a diffusing process to provide axially diffused or axially widened light beams to optical sensors 326. In a non-limiting example, diffuser sheet 346 may diffuse reflected light 332 in an axial direction with respect to cylinder 320.

FIG. 4A depicts a side view of optical encoder 318. As shown in FIG. 4A, emitted light 330 may contact and reflect from a portion of cylinder 320 including a light stripe or color. As discussed herein, light stripe or color may reflect the emitted light 330 in a specular manner. Emitted light 330 may reflect from cylinder 320 in a specular manner toward optical sensors 326 in a similar fashion as discussed herein with respect to FIG. 3A. However, as shown in FIG. 4A, prior to reaching optical sensors 326, reflected light 332 may first pass through diffuser sheet 346 disposed over optical sensor 326. Reflected light 332 may pass through diffuser sheet 346 and undergo a diffusing process. In a non-limiting example, diffuser sheet 346 positioned on optical sensors 326 may diffuse reflected light 332 in an axial direction that may be parallel to the longitudinal axis of cylinder 320, prior to the reflected light 332 reaching optical sensors 326. In the non-limiting example shown in FIG. 4A, reflected light 332 may expand, spread-out or otherwise axially diffuse a single beam of reflected light 332 into a widened spread of reflected light 348. As a result, the diffused reflect light 348 formed by passing through diffuser sheet 346 may subsequently be directed toward optical sensors 326 for determining a movement and/or rotation of cylinder 320, as discussed herein.

As shown in FIG. 4B, cylinder 320 of optical encoder 318 may be substantially rotated, such that a dark stripe or color of cylinder 320 may be contacted by emitted light 330. As discussed herein, dark stripe or color of cylinder 320 may reflect light in a dispersive manner. As such, emitted light 330 may undergo a dispersive process when reflected from the dark stripe or color of cylinder 320, as similarly discussed herein. As shown in FIG. 4B, the dispersive process performed in optical encoder 318 by the dark stripe or color of cylinder 320 may result in reflected light 332 being dispersed throughout the housing of the electronic device (see, FIG. 2). As a result, and as shown in FIG. 4B, dispersed reflected light 332 may not pass through diffuser sheet 346 to contact optical sensors 326 of optical encoder 318.

Figure 5:
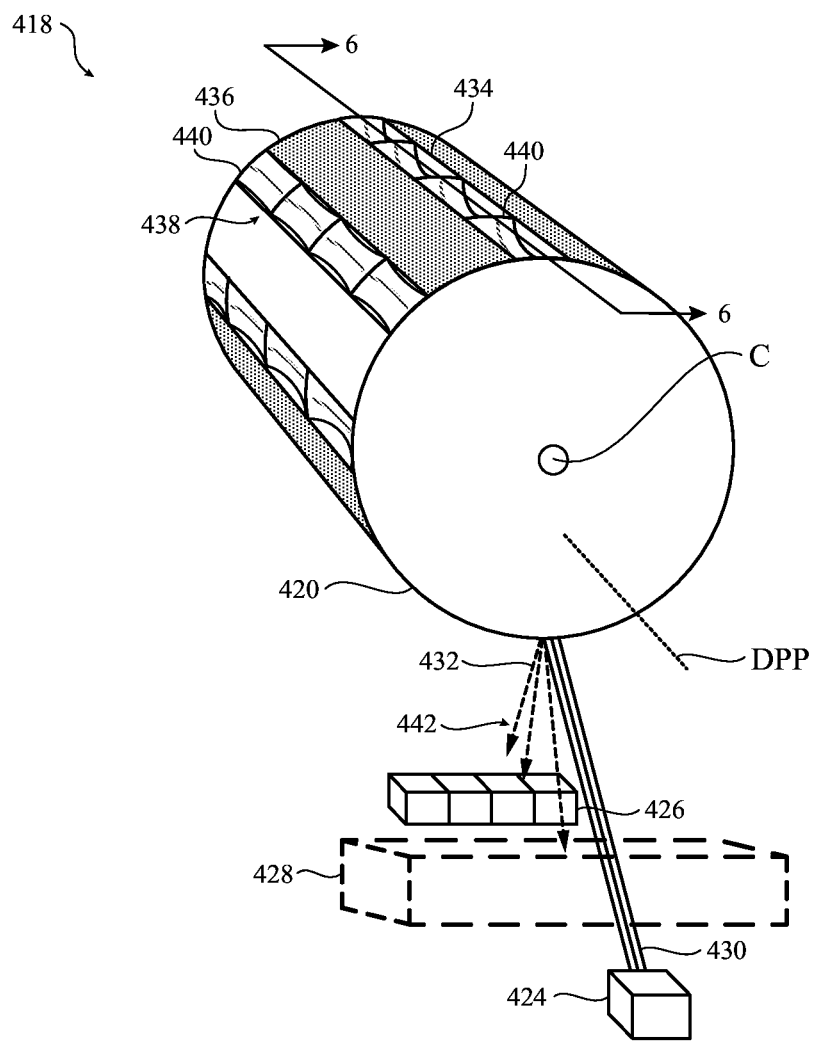
FIG. 5 depicts a front perspective view of an optical encoder of the electronic device of FIG. 2.
Figure 8A:
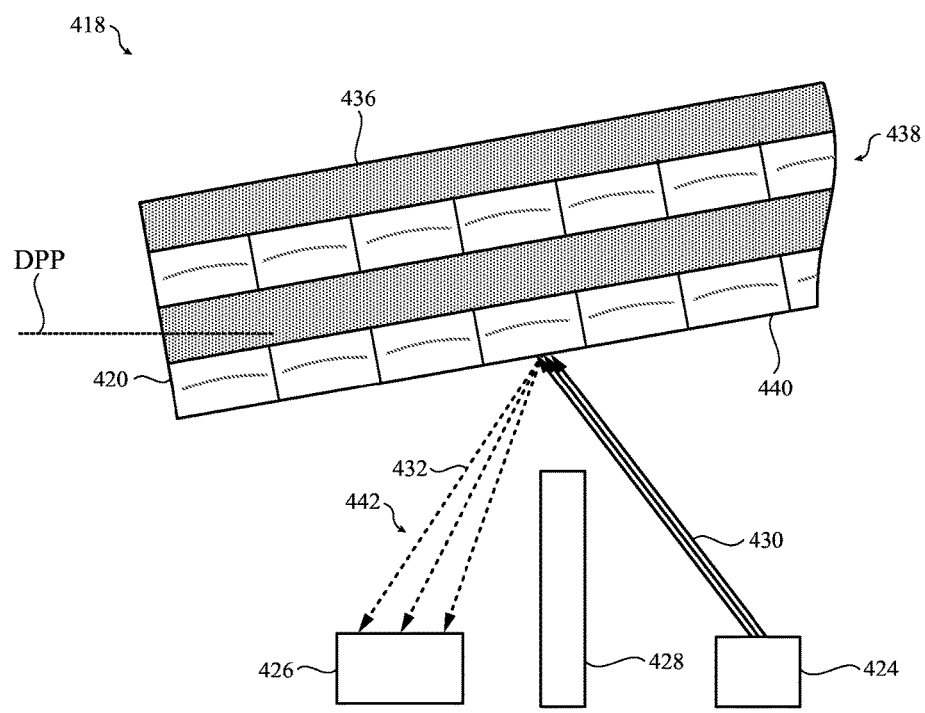
FIGS. 8A and 8B depict side views of the optical encoder of FIG. 5.
Figure 8B:
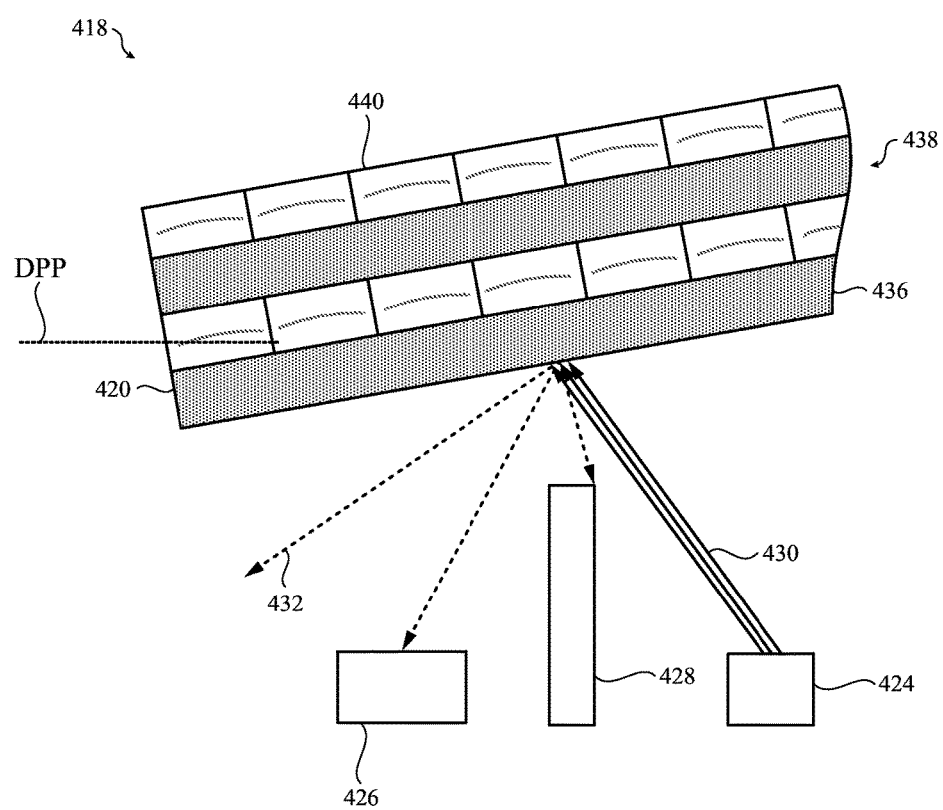

FIG. 5 depicts an illustrative prospective view of optical encoder 418 according to another non-limiting example. As shown in FIG. 5, cylinder 420 may be substantially misaligned from a desired position. As shown in FIGS. 5, 8A and 8B, cylinder 420 may be misaligned and substantially angled toward light source 424. Also shown in FIGS. 5, 8A and 8B, light source 424 may emit multiple beams of emitted light 430. Multiple beams of emitted light 430 may be a result of diffusing light from light source 424 using a diffuser member as discussed herein with respect to FIGS. 3A-3C, or alternatively, light source 424 may include a plurality of lights, each light emitting a single, individual beam of emitted light 430.

In FIG. 5, cylinder 420 may include a plurality of recesses 434. The plurality of recesses 434 may be formed circumferentially around, and partially through, cylinder 420. Each recess 434 may be separated by a transitional portion 436 of cylinder 420. As shown in FIG. 5, and discussed herein, the plurality of recesses 434 of cylinder 420 may include a light stripe or color that may reflect light in a specular manner, and transitional portion 436 may include a dark stripe or color that may reflect light in a dispersive manner. Each recess 434 may be formed in cylinder 420 along the entire length of cylinder 420, as shown in FIG. 5, or alternatively, along a portion of the length of cylinder 420 (not shown).

Optical encoder 418 may also include diffuser members 438 to aid in the reflecting of reflected light 432 toward optical sensors 426, as discussed herein. As shown in FIG. 5, diffuser members 438 may include at least one set of diffuser lenses 440 positioned on the outer surface of cylinder 420. In the non-limiting example shown in FIG. 5, a plurality of sets of diffuser lenses 440 may be disposed along an entire length of cylinder 420, and each lens of each individual set of diffuser lenses 440 may be positioned adjacent one another spanning over the length of cylinder 420. Additionally as shown in FIG. 5, where cylinder 420 includes recesses 434, a single set of diffuser lenses 440 may be positioned within a corresponding recess 434 formed on cylinder 420.

Diffuser lenses 440 may be substantially transparent to allow emitted light 430 to shine through. The transparency of diffuser lenses 440 may be dependent on, at least in part, a geometry or shape of diffuser lenses 440, the reflective properties of cylinder 420, and the reflective properties of the stripe or color formed within recesses 434. In a non-limiting example as shown in FIG. 4, and discussed in detail herein, diffuser lenses 440 may be substantially transparent to allow emitted light 430 to contact and reflect off of recesses 434 of cylinder 420, and subsequently, through diffuser lenses 440 to form diffused reflective light 432.

Each diffuser lens 440 may be formed with distinct, non-linear geometries or shapes. In a non-limiting example shown in FIGS. 5-8B, each lens of diffuser lenses 440 may be formed from a substantially concave lens. The concave lens forming each of the set of diffuser lenses 440 may allow diffuser lenses 440 to be nested within recesses 434 formed in cylinder 420. In the non-limiting example, the concave lens may allow each of the set of diffuser lenses 440 to be positioned completely within recesses 434 formed within cylinder 420 to maintain a substantially uniform diameter of cylinder 420.

Figure 6:
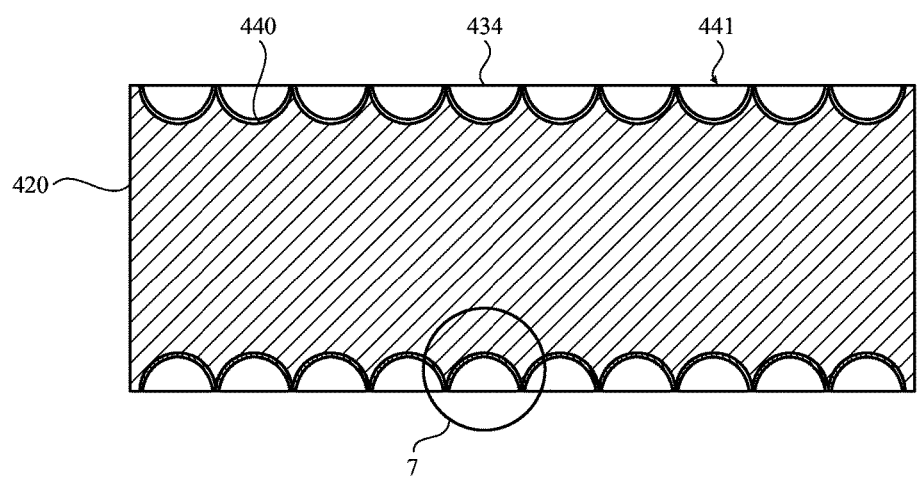
FIG. 6 depicts a side cross-section view of the cylinder of the optical encoder taken along line 6-6 of FIG. 5.

FIG. 6 shows a side cross-section view of cylinder 420 of FIG. 5 taken along line 6-6. As discussed herein, each lens in the set of diffuser lenses 440 forming diffuser member 438 may be positioned adjacent one another within recess 434. In the non-limiting example shown in FIG. 6, positioning the concave, diffuser lenses 440 adjacent one another within recess 434 may form a scalloped pattern 441 of lenses. That is, and as shown in FIG. 6, by forming each lens of diffuser lenses 440 from a concave lens, and subsequently positioning each lens adjacent one another, each set of diffuser lenses 440 may form scalloped pattern 441 of lenses within cylinder 420.

Figure 7:
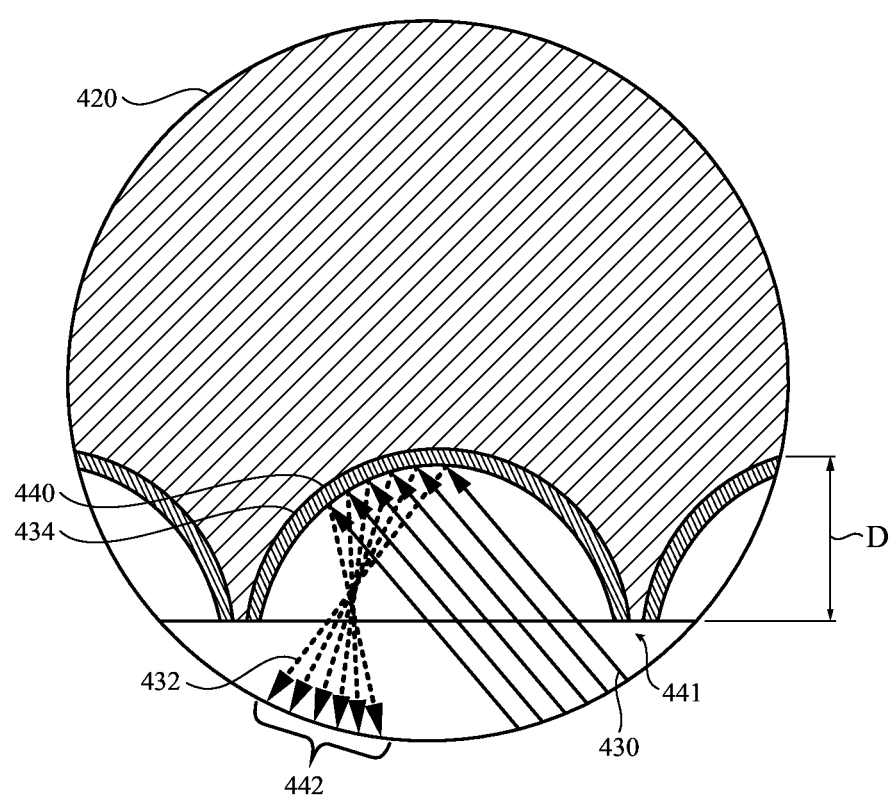
FIG. 7 depicts an enlarged side view of a portion of the cylinder of the optical encoder of FIG. 6.

With continued reference to FIGS. 5 and 6, FIG. 7 shows an enlarged portion of cylinder 420 including diffuser lenses 440 formed in a scalloped pattern 441. Diffuser lenses 440 may aid in reflecting the reflected light 432 toward optical sensors 426 (see, FIG. 5). In a non-limiting example shown in FIGS. 5 and 7, when emitted light 430 is provided to cylinder 420 having sets of diffuser lenses 440, reflected light 432 reflected toward optical sensors 426 may be axially diffused and/or may diffuse in an axial direction with respect to cylinder 420 toward optical sensors 426. In the non-limiting example, transparent diffuser lenses 440 may allow emitted light 430 to pass through diffuser lenses 440 to contact the surface of recess 434 formed within cylinder 420. The surface of recess 434 formed in cylinder 420 may include a light stripe or color that may reflect the emitted light 430 in a specular manner.

In a non-limiting example, when passing through diffuser lenses 440, emitted light 430 may undergo an axial diffusion process, which may cause emitted light 430 to expand, spread-out or otherwise disperse (not shown). As a result, the axially diffused emitted light 430 passing through transparent diffuser lenses 440 may contact recess 434 of cylinder 420 in an expanded area. Similarly discussed herein with respect to FIG. 3A, axially diffused emitted light 430 that passes through diffuser lenses 440 may be reflected from the surface of recess 434 in a specular manner. However, because emitted light 430 is axially diffused prior to reflecting from the surface of recess 434, reflected light 432 may include axially diffused light. Axially diffused, reflected light 432 may pass through diffuser lenses 440, and undergo another diffusion process, which may result in further or additional, axially diffused reflected light 432. Similar to the emitted light 430, and shown in FIGS. 5 and 7, reflected light 432 reflected from recess 434 may expand, spread-out or otherwise axially disperse through diffuser lenses 440. Diffused reflected light 432 may expand or axially diffuse into a widened reflected light beam, and may be reflected away from cylinder 420. In the non-limiting example shown in FIGS. 5 and 7, the widened or diffused reflected light 432 may be reflected away from cylinder 420, and substantially toward optical sensors 426, as discussed herein.

Additionally in the example embodiment shown in FIGS. 5 and 7, a concentrated portion 442 of the plurality of axially diffused reflected light 432 may be directed toward optical sensors 426 (see, FIG. 5). As shown in FIG. 7, the concave geometry of diffuser lenses 440 may allow for a concentrated portion 442 of diffused reflected light 432 to be reflected toward optical sensors 426. In an embodiment, and as a result of diffuser lenses 440 being formed from a concave lens, diffused reflective light 432 exiting and/or being reflected from diffuser lenses 440 may be primarily reflected from diffuser lenses 440 through the portion of the lens having the greatest concavity. Alternatively, the concave shape of diffuser lenses 440 results in diffusing the light over a limited angle. That is, as a result of the surface angle changing because of the concave geometry of diffuser lens 440, the angle of incidence and the output angle for reflective light 432 also changes. The output angles of reflected light 432 are within a select range, which is limited by the range of the surface angles formed by the concave geometry of diffuser lens 440. As such, diffuser lenses 440 may both axially diffuse reflected light 432 as well as concentrate or "focus" the majority of the axially diffused reflected light 432 to a concentrated portion 442 to aid in the detection of reflected light 432 by optical sensors 426 when cylinder 420 is misaligned. Focusing the majority of reflected light 432 refers to the limited range of the output angles of which reflected light 432 may be reflected from diffuser lenses 440.

The depth (D) of concavity in the concave lens forming each of the sets of diffuser lenses 440 may determine the size and/or dispersion of concentrated portion 442 of the plurality of axially diffused reflected light 432. That is, the larger the depth (D) of the concave lens forming each lens in the set of diffuser lenses 440, the larger the concentrated portion 442 of the plurality of axially diffused reflected light 432 may be. As discussed herein, the dispersion of concentrated portion 442 of reflected light 432 may be critical to accurately detect diffused reflective light 432 when determining the movement and/or rotation of cylinder 420.

Although discussed herein as diffusing both emitted light 430 and reflected light 432, it is understood that diffuser lenses 440 may axially diffuse the light in only one direction. That is, diffuser lenses 440 positioned within cylinder 420 may axially diffuse emitted light 430 prior to the light contacting the surface of recess 434, or diffuser lenses 440 may axially diffuse the specularly reflected light 432 reflected from recess 434 prior to the reflected light 432 from contacting optical sensors 426.

FIGS. 8A and 8B depict side views of optical encoder 418 of FIGS. 5-7. As shown in FIG. 8A, and as similarly discussed herein with respect to FIGS. 8 and 10, emitted light 430 may be emitted towards cylinder 420 having sets of diffuser lenses 440 positioned thereon. As discussed above, emitted light 430 and reflected light 432 may pass through diffuser lenses 440 and undergo an axial diffusion process, which may ultimately result in a widened or axially diffused, reflected light 432 from being reflected away from cylinder 420 toward optical sensors 426. As shown in FIG. 8A, concentrated portion 442 of the widened or axially diffused reflected light 432 may contact optical sensors 426 of optical encoder 418, as a result of diffuser lenses 440 being formed from concave lenses, as discussed herein.

Additionally, as a result of the misalignment and/or angle of cylinder 420, portions of the widened or diffused, reflected light 432 may also be reflected back towards light source 424. However, as shown in FIG. 8A, wall member 428 may prevent diffused, reflected light 432 from being reflected back toward light source 424. That is, reflected light 432 reflected back toward light source 424 may contact and/or be absorbed by wall member 128, and may not be reflected back to interfere with the emitted light 430 from light source 424.

As shown in FIG. 8B, cylinder 420 of optical encoder 418 may be substantially rotated, such that transitional portion 436 of cylinder 420 may be contacted by emitted light 430. As similarly discussed herein with respect to FIG. 3B, transitional portion 436 may include a dark stripe or color, which may reflect light in a dispersive manner. As shown in FIG. 8B, when emitted light 430 contacts transitional portion 436, emitted light 430 may be dispersed, and may reflect away from cylinder 420. Distinct from the diffusion process occurring as a result of diffuser lenses 440, the widened or diffused, reflected light 432 reflected from transitional portion 436 may expand, spread-out or disperse evenly away from cylinder 420 toward optical sensors 426 and other portions of the housing (see, FIG. 2) containing optical encoder 418. That is, transitional portion 436 of cylinder 420 may disperse emitted light 430 to form evenly dispersed reflected light 432 within optical encoder 418. As shown in FIG. 8B, this may result in minimal reflected light 432 from contacting optical sensors 426, and the majority of the dispersed, reflected light 432 being distributed throughout optical encoder 418. By comparison, and as discussed herein with respect to FIG. 8A, concave diffuser lenses 440 may form a concentrated portion 442 of diffused reflected light 432 to contact optical sensors 426, and only a minimal portion of diffused reflected light 432 reflected from diffuser lenses 440 may be dispersed throughout optical encoder 418.

In another non-limiting example, not shown, dark stripe or color of transitional portion 436 of cylinder 420 may absorb emitted light 430. That is, and as similarly discussed herein with respect to FIG. 3C, transitional portion 436 on cylinder 420 may substantially absorb emitted light 430, and may not subsequently reflect light (e.g., reflected light 432) toward optical sensors 426 for detection by optical encoder 418.

In another non-limiting example, and similar to FIGS. 5-8B, diffuser members 438 may be formed from sets of diffuser lenses 440 positioned on cylinder 420. However, in the non-limiting example and distinct from FIGS. 5-8B, diffuser lenses 440 may be positioned directly on the surface of cylinder 420. That is, diffuser lenses 440 may be positioned on, and may protrude from the surface of cylinder 420. As a result, cylinder 420 may include a varying diameter, where the diameter is larger in the portions including diffuser lenses 440, than the diameter having transitional portions 436.

In another non-limiting example, transitional portion 436 of cylinder 420 may not have a dark stripe or color, but rather may include a light stripe or color. That is, the entire surface of cylinder 420 may include a light stripe or color, where diffuser lenses 440 may only cover portions of cylinder 420. In the non-limiting example, when emitted light 430 contacts and reflects from a portion of cylinder 420 including sets of diffuser lenses 440, reflected light 432 may be axially diffused in a similar manner as discussed herein.

However, in the non-limiting example, when emitted light 430 contacts and reflects from transitional portion 436 of cylinder 420, reflected light 432 may be reflected in a specular manner as discussed herein with respect to FIG. 3A. That is, as a result of transitional portion 436 having a light stripe or color, which may reflect light in a specular manner, reflected light 432 may mirror emitted light 430, and may be reflected without undergoing an axial diffusion process. As a result of the reflective properties and the misalignment of cylinder 420 from a desired, planar position (DPP), reflected light 432 may be reflected within housing 102 of the electronic device 100 (see, FIG. 2) without contacting optical sensors 426.

Figure 9:
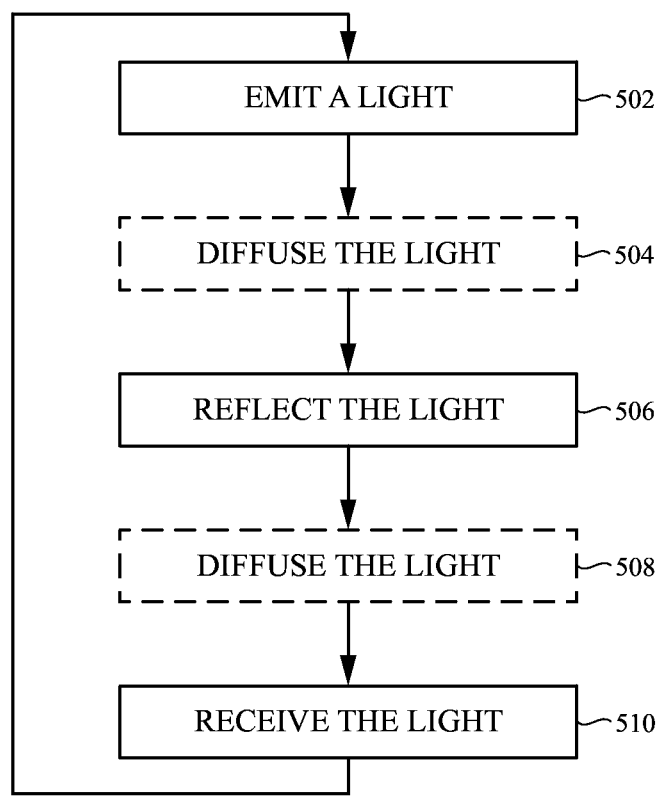
FIG. 9 shows a flow chart illustrating an example process for detecting rotational movement of a rotatable cylinder of an optical encoder for an electronic device, which may be performed by the optical encoders as shown in FIGS. 3A-8B.

FIG. 9 depicts an example process for detecting rotational movement of a rotatable cylinder of an optical encoder. That is, FIG. 9 is a flowchart depicting one example process 500 for detecting or determining the movement or rotation of the cylinder of an optical encoder included in an electronic device.

In operation 502, light may be emitted from a light source toward the cylinder of the optical encoder. The light may be continuously emitted from the light source to the cylinder to continuously provide input for determining the movement of the cylinder, as discussed herein. Additionally, the light emitted from the light source toward the cylinder of the optical encoder in operation 502 may be utilized to determine an initial position of the cylinder.

In operation 504, the emitted light from the light source may be axially diffused. That is, the light emitted from the light source to the cylinder may be axially diffused prior to reaching the cylinder. The emitted light may be axially diffused using a diffuser member. In a non-limiting example, the diffuser member may be a diffuser window positioned over the light source emitting the light, such that the emitted light may pass through the diffuser window and undergo a diffusion process. As discussed herein, by axially diffusing the emitted light, the light emitted in operation 502 may expand, spread-out or otherwise disperse along the longitudinal axis of the cylinder before reaching the cylinder of the optical encoder. The axial diffusing of the emitted light in operation 504 is shown in phantom as optional. Diffusing the emitted light may be optional so long as further diffusing processes are performed when detecting the rotational movement of the cylinder, as discussed herein.

In operation 506, the emitted light may be reflected by the cylinder. That is, emitted light, either diffused in operation 504 or directly emitted in operation 502, may contact and be substantially reflected from the cylinder. As discussed herein, the emitted light may be reflected from the cylinder by way of the reflective properties of the cylinder and/or reflective components positioned on the cylinder. That is, the cylinder may reflect the emitted light away from the cylinder using lenses, stripes or reflective colors formed on the cylinder. Additionally, and as discussed herein, the light may be reflected from the cylinder toward a plurality of optical sensors for detecting the reflected light.

In operation 508, the reflected light may be axially diffused. That is, the light reflected from the cylinder in operation 506 may be diffused or spread along at least an axial direction along the length of the cylinder. The reflected light may be axially diffused using a variety of diffuser members positioned within the optical encoder. In a non-limiting example, the diffuser members may be a plurality of sets of diffuser lenses positioned on the cylinder. When the emitted light contacts the sets of diffuser lenses, the light may undergo a diffusion process, which may result in the reflected light being axially diffused. In another non-limiting example, the diffuser member may be a diffuser sheet positioned between the cylinder and the optical sensors. The reflected light from the cylinder may pass through the diffuser sheet and under an axial diffusion process prior to contacting the optical sensors, as discussed herein. Similarly discussed herein with respect to operation 504, the axial diffusion process in operation 508 may be optional so long as a diffusion process occurred prior to the reflecting of the emitted light in operation 506.

In operation 510, the light may be received by optical sensors of the optical encoder. That is, previously diffused, reflected light contacts optical sensors of the optical encoder to determine a position of the cylinder. The optical sensors may receive the reflected light, and may associate the received light to indicate a specific position of the cylinder at an instantaneous detected time. That is, the optical sensor may receive the light and further determine a first output current of each optical sensor at a first time.

Operations 502-510 may be continuously performed, as shown in FIG. 9, to determine the movement and/or rotational change in the cylinder of the optical encoder. That is, operations 502-510 may be performed multiple times, where each time the diffused, reflected light is received in operation 510, and a distinct electrical output (e.g., current, voltage, and so on) is determined for each of the optical sensors at distinct times. The distinct electrical output determined by the optical sensors corresponds to how much reflective light is being exposed to the optical sensors which, as discussed herein, varies dependent upon the position of the cylinder and the portion of the encoding pattern formed on the cylinder exposed to and/or reflecting light to the optical sensors. These distinct electrical outputs may be compared to previously determined electrical outputs at past times, to determine how much the electrical output has changed and, ultimately, how much movement and/or rotation of the cylinder has been realized.

For example, light intensity of the received reflected light by the optical sensors at a first time is compared against light intensity of the received reflected light by the optical sensors at a second time. If the light intensity at the second time is greater than the light intensity at the first time, the cylinder may be rotating in a counter-clockwise direction. Likewise, if the light intensity at the second time is less than light intensity at a first time, the cylinder may be rotating in a clockwise rotation. Although the example above specifies that two samples are compared to determine movement of the cylinder, the operations discussed herein may use any number of samples, sequential or otherwise, to determine a directional movement of the cylinder of the encoder.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A watch, comprising:
   a housing having an opening;
   a crown positioned at least partially within the opening and configured to receive rotational input; and
   an optical encoder positioned within the housing and comprising:
   a rotatable cylinder connected to the crown;
   an encoding pattern formed on an outer surface of the rotatable cylinder, the encoding pattern comprising:
   a group of light-reflective markings; and
   a group of non-reflective markings interspersed with the group of light-reflective markings;
   a light source positioned adjacent the rotatable cylinder and configured to provide a light beam to the outer surface of the rotatable cylinder; and
   an array of optical sensors positioned adjacent the rotatable cylinder and configured to detect the rotational input using a portion of the light beam reflected from the rotatable cylinder along an axial direction, wherein
   the light beam provided by the light source is widened by the optical encoder in the axial direction prior to being received by the array of optical sensors.

2. The watch of claim 1, wherein the optical encoder comprises a diffuser member configured to widen the light beam in the axial direction by diffusing at least one of: the light beam provided by the light source before being reflected, or the light beam reflected by the rotatable cylinder.

3. The watch of claim 2, wherein the diffuser member is positioned on the rotatable cylinder and comprises: at least one set of diffuser lenses positioned on the outer surface of the rotatable cylinder.

4. The watch of claim 3, wherein the at least one set of diffuser lenses is disposed along an entire length of the rotatable cylinder.

5. The watch of claim 3, wherein each of the at least one set of diffuser lenses comprises a concave lens.

6. The watch of claim 3, wherein each diffuser lens of the at least one set of diffuser lenses is positioned adjacent one another to form a scalloped pattern of diffuser lenses.

7. The watch of claim 3, wherein the at least one set of diffuser lenses is separated by a transitional portion of the rotatable cylinder, the transitional portion configured to diffuse the light beam.

8. The watch of claim 3, wherein the at least one set of diffuser lenses is disposed over a distinct light-reflective marking of the group of light-reflective markings.

9. The watch of claim 1, wherein the optical encoder comprises a wall member positioned between the light source and the array of optical sensors, the wall member configured to prevent at least one of: the light beam from the light source from being directly exposed to the array of optical sensors, or the light beam reflected from the rotatable cylinder from being reflected toward the light source.

10. A watch, comprising:
a housing;
a display positioned within the housing and configured to depict a graphical output of the watch;
a rotatable cylinder extending into the housing and configured to reflect light, the rotatable cylinder comprising an encoding pattern of alternating reflective stripes having distinct light-reflective properties;
a light source positioned adjacent the rotatable cylinder;
an array of optical sensors positioned adjacent the rotatable cylinder and configured to detect a rotation of the rotatable cylinder using a portion of the light reflected from the rotatable cylinder along an axial direction; and
a diffuser member configured to widen light in the axial direction and positioned on at least one of:
the rotatable cylinder;
the light source; or
the array of optical sensors, wherein
the graphical output is responsive to the rotation of the rotatable cylinder.

11. The watch of claim 10, wherein the diffuser member is positioned on the light source and comprises a diffuser window covering at least a portion of the light source.

12. The watch of claim 11, wherein the diffuser window is positioned between the light source and the rotatable cylinder.

13. The watch of claim 11, wherein a light beam provided by the light source passes through the diffuser window to the rotatable cylinder.

14. The watch of claim 10, wherein the diffuser member is positioned on the array of optical sensors and comprises a diffuser sheet disposed over at least a portion of the array of optical sensors.

15. The watch of claim 14, wherein the reflected light from the rotatable cylinder is configured to pass through the diffuser sheet to the array of optical sensors.

16. The watch of claim 14, wherein the diffuser sheet covers at least a portion of a surface of the array of optical sensors, the surface configured to receive the reflected light from the rotatable cylinder.

17. The watch of claim 10, wherein the encoding pattern of alternating reflective stripes comprises: a group of light colored-stripes reflecting light in a specular manner; and a group of dark colored-stripes reflecting light in a diffusive manner.

18. A method of detecting rotational movement of a rotatable cylinder of a watch, the method comprising:
emitting an emitted light beam, using a light source positioned within a housing of the watch, toward a portion of the rotatable cylinder within the housing;
reflecting the emitted light beam off the rotatable cylinder to form a reflected light beam along an axial direction of the rotatable cylinder;
receiving the reflected light beam at an array of optical sensors positioned along the axial direction; and
prior to receiving of the reflected light beam, widening the light beam in the axial direction by diffusing at least one of the emitted light beam, or the reflected light beam using a diffuser member; and
estimating an amount of rotation of the rotatable cylinder based on the reflected light beam that is received at the array of optical sensors.

19. The method of claim 18, wherein estimating the amount of rotation of the rotatable cylinder comprises:
determining a first electrical output of each optical sensor of the array of optical sensors at a first time;
receiving rotational movement of the rotatable cylinder;
determining a second electrical output of each optical sensor of the array of optical sensors at a second time subsequent to the received rotational movement of the rotatable cylinder; and
computing the amount of rotation using the first electrical output and the second electrical output.

20. The method of claim 18, wherein axially diffusing the emitted light beam comprises passing the emitted light beam through a diffuser window covering at least a portion of the light source to spread the emitted light beam in an axial direction.

21. The method of claim 18, wherein axially diffusing the emitted light beam comprises passing the emitted light beam through a plurality of diffuser lenses disposed around an outer surface of the rotatable cylinder to spread the reflected light beam in an axial direction.

22. The method of claim 18, wherein axially diffusing the reflected light beam comprises passing the reflected light beam through a diffuser sheet disposed over at least a portion of the array of optical sensors to spread the reflected light beam in an axial direction.

* * * * *